Nov. 5, 1963    G. SICHLING    3,109,976
PHASE AND FREQUENCY CONVERTER DEVICE
Filed Aug. 4, 1959    2 Sheets-Sheet 1

INVENTOR
Georg Sichling.
BY R.Y.Brodahl
ATTORNEY

3,109,976
PHASE AND FREQUENCY CONVERTER DEVICE
Georg Sichling, Pacific Palisades, Calif., assignor to Siemens-Schuckertwerke Aktiengesellschaft, Erlangen, Germany, a corporation of Germany
Filed Aug. 4, 1959, Ser. No. 831,595
Claims priority, application Germany Aug. 8, 1958
3 Claims. (Cl. 321—4)

The present invention relates to a device for converting alternating current of constant frequency into an alternating current of variable frequency and, if desired, of a different number of phases. The present converter device utilizes a rectifier unit and an inverter unit as well as a distributor for the signal impulses obtained from an impulse generator, and which is adapted to convert the signal impulses into squarewave voltages having a certain phase relationship with respect to each other, and to provide from said squarewave voltages control signals for the switching elements of the inverter unit in a fashion corresponding to the conversion of a direct current into an alternating current of variable frequency and with a certain number of phases.

It has already been known to provide for power systems, particularly systems for supplying power to three-phase machines for speed control purposes, static switching elements in the form of transistors. It has been found that with such arrangements using transistors, certain difficulties may be encountered if under certain operating conditions, the Zener effect causes an undesirable voltage limitation or if, under other operating conditions, the resulting saturation causes a current limitation. It is the object of the invention to overcome the above disadvantages by simple means.

Semiconductors of the p-n-p-n type or the n-p-n-p type called Dynistor diodes or switching diodes are known to be free of Zener effects and saturation phenomena. These semiconductor elements have a characteristic similar to current converters, with the Dynistor diodes blocking the current flow only in one direction, whereas the switching diodes block the current in both directions as long as the voltage does not exceed a certain value. Such characteristics make the above-mentioned semiconductor elements unsuitable for the purposes outlined above.

It is an object of the present invention to provide a converter which does not have the aforesaid disadvantages and which utilizes Dynistor diodes or switching diodes as switching elements. This is accomplished according to the invention by making the rectifier and inverter units synchronously dependent in their control upon the impulse generator, and by rendering the switching elements at least of the inverter unit additionally dependent in their conduction periods upon the distributor.

The coupling between the rectifier voltage and the output frequency enables, for example, a controllable synchronous motor connected to the secondary A.-C. network to deliver a constant maximum torque at any speed. The positive extinction of the momentarily current-carrying switching elements prior to the initiation of the conduction of the corresponding following, current-carrying switching elements connected in series therewith makes possible the use of said semiconductor elements, which offers the advantage of completely avoiding the deleterious effect of a current and voltage limitation.

A preferred embodiment of the invention will now be described with reference to the accompanying drawings in which.

Figure 1:
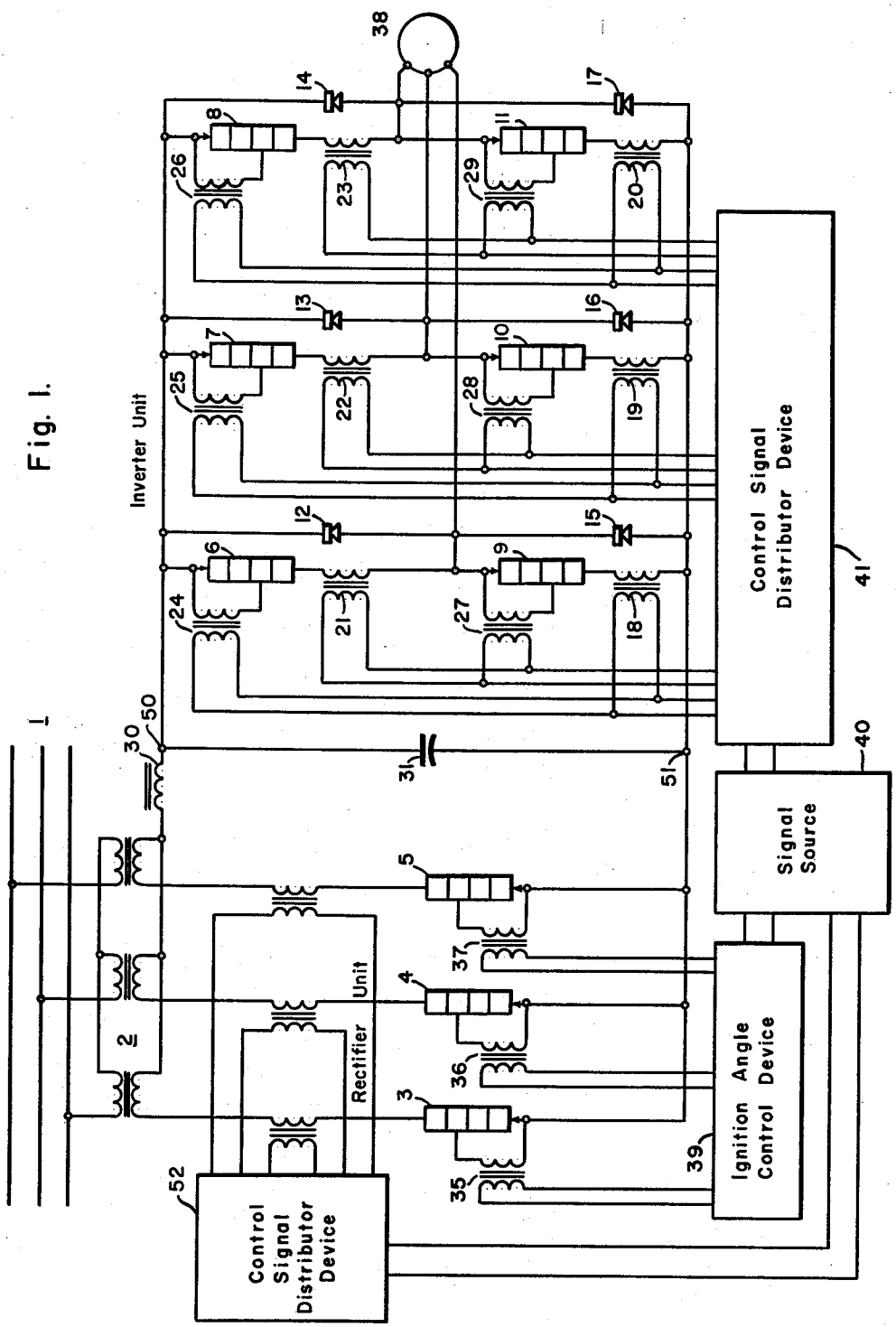
FIG. 1 is a schematic of a preferred embodiment of the invention.

In the drawings, the invention is shown applied to the conversion of three-phase current of a constant frequency into three-phase current of variable frequency, such as for the speed control of a synchronous motor connected to the secondary three-phase circuit.

In FIGURE 1, a three-phase power supply network 1 of constant frequency is shown to have connected thereto a transformer 2, the secondary side of which is adapted to supply a rectifier unit. Said rectifier unit comprises substantially a switching diode 3, 4 and 5 respectively provided for each phase, said switching diodes all being of the same type (either n-p-n-p or p-n-p-n type), and being connected in common to the neutral point of the secondary winding through a reactor 30 and a capacitor 31. Each switching diode has associated therewith a respective ignition transformer 35, 36 and 37, the primary winding of which is adapted to respond to a conduction-angle controlling device 39 in a manner known per se, and the secondary winding of which is connected between an outer and an inner electrode of the related switching diode. The capacitor 31 has connected thereacross a three-phase current inverter unit in Graetz (full-wave) rectifier-circuit arrangement, said inverter unit consisting of three parallel groups of two series-connected switching semiconductor elements 6 and 9, 7 and 10, and 8 and 11 respectivelly. Each of the latter semiconductor elements has connected in parallel thereto a respective barrier-layer rectifier 12 to 17. The forward direction of the rectifier is opposite to the current-carrying direction of the switching element.

The function and mode of operation of these rectifiers will be explained later herein.

Figure 2:
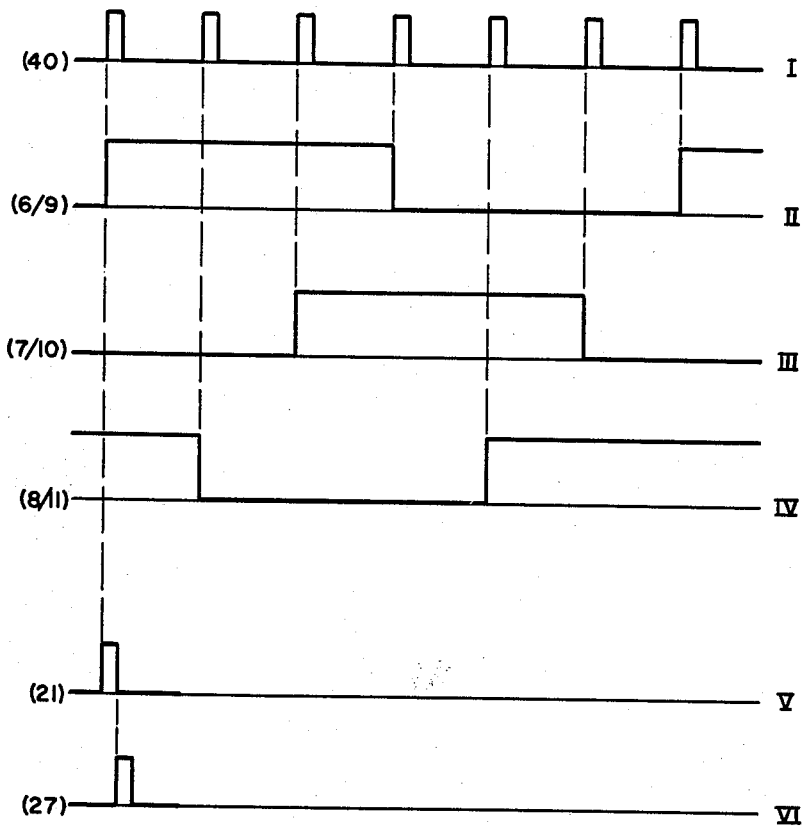
FIG. 2 is a graph illustrating the operation of FIG. 1.

The load which in the embodiment is shown to be a motor 38 is connected to the secondary three-phase lines connected to the common points between the two switching elements of each group. For the control of the individual switching elements or diodes 6 to 11 there are provided ignition transformers 24 to 29, and in the external circuit of each switching diode there is also provided respectively one of the extinguishing transformers 18 to 23. The extinguishing transformers have their secondary windings connected in the external circuit, and have their primary windings connected as illustrated in greater detail in FIG. 3. These latter primary windings as well as the primary windings of the ignition transformers are responsive to the operation of a control signal distributor device 41. This distributor device 41 is adapted to distribute the signal impulses emanating from the signal impulse generator 40 and appearing at regular intervals, among the individual switching diodes 6, 7, 8, 9, 10 and 11 in dependence upon the number of phases as shown in FIGURE 2 by converting the received impulses into square-wave voltages of corresponding phase relation and deriving from such square-wave voltages the igniting and extinguishing impulses which are applied in proper sequence to the control elements of the switching diodes so that the direct current from across the terminals 50 and 51 is converted into a polyphase current. The distributor is of a well known type and includes bistable state trigger stages.

The impulse generator or signal source comprises a multivibrator or another well-known device, the frequency of which may be changed as desired, for example, by applying a D.-C. control voltage of variable magnitude. The voltage used for controlling the impulse generator also is applied to the ignition-angle control device 39 such that a corresponding operation of the switching diodes 3 to 5 through the ignition transformers 35 to 37 will permit a shifting of the ignition-angle to cause a change of the D.-C. voltage across the terminals 50 and 51, which is so selected that any increase of the frequency by the impulse generator 40 will result an a synchronous increase of the D.-C. voltage by the ignition angle control device 39 so that the motor 38 connected to the A.-C. network can always produce the same maximum torque. The same applies analogously in the case where the applied D.-C. control voltage is decreased and results in a decrease of the impulse generator or signal source 40 frequency.

The conversion of the individual signal impulses provided at regular intervals by the impulse generator is illustrated in FIG. 2 curve I. Every third impulse of these signal impulses is used by the distributor to produce a square-wave voltage divided among the individual groups with the phase relation as shown in FIG. 2 curves II to IV; as shown in FIG. 2 curves V and VI, there are derived from the leading edges of said square-wave voltages two impulses, one of which represents the extinguishing impulse, and the other one of which impulses represents the delayed ignition impulse for the two semiconductor elements of a particular group. This is necessary in order to prevent a short-circuit by causing the conducting switching diode element to block earlier than the switching diode firing next in the same group. The blocking rectifiers connected in parallel and associated with the individual semi-conductor elements have the function to prevent upon the extinction of the switching element the occurrence of over-voltages by feeding the resulting reactive current in reverse direction to the capacitor 31. This reactive power which is extraordinarily high at low frequencies and with an inductive load (conditions existing, for example, with synchronous three-phase motors) must be absorbed by the capacitor to prevent an undesirably high increase of the D.-C. voltage. For this purpose, the capacitor must have a correspondingly high voltage rating.

In order to permit as low a rating of the capacitor as possible, it is desirable to keep the voltage in the D.-C. network at a constant value by operating the rectifier, when a certain capacitor voltage is exceeded, temporarily as an inverter so that the reactive power or generator power of the motor 38 will be fed back to the primary network. Furthermore, it is also possible to eliminate reactive power by symmetrically igniting and positively extinguishing the switching diodes of the rectifier unit so that the primary network will be free from reactive power. For this purpose, the extinguishing transformers 32 to 34 may be arranged in the external circuit of the switching diodes 3 to 5, as schematically shown in the drawing, and said switching diodes as well as the ignition transformers may be made responsive to the operation of a second control signal distributor device 52.

Figure 3:
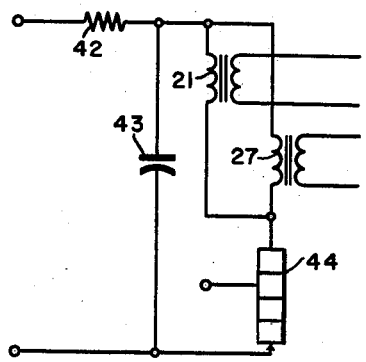
FIG. 3 is a schematic showing a feature of FIG. 1.

The power required upon the extinction is relatively high and is determined by the value of the current and voltage prevailing at the time of extinction. However, due to the extraordinary brevity of the extinguishing time obtainable with said semiconductors, the required energy is relatively small so that an arrangement such as illustrated in FIG. 3 may be used satisfactorily for the extinction, said arrangement being shown in FIG. 3 for one switching diode. The primary circuit of the extinguishing transformer 21 includes a switching diode 44 and a capacitor 43 connected in parallel thereto, said capacitor being maintained in a charged condition by an auxiliary source of current through a resistor 42. The switching diode 44 is adapted to respond to the operation of the distributor and to open upon the occurrence of a corresponding control impulse so that the capacitor energy is transferred to the circuit of the corresponding semiconductor diodes as extinguishing energy.

If Dynistor diodes are used instead of the above-described switching diodes, blocking rectifiers have to be connected ahead of said Dynistor diodes in order to prevent a current flow in reverse direction through said Dynistor diodes. This applies as well to the controlled semiconductors of the controlled rectifier. They may be omitted, if desired, in the inverter since in that case they are replaced by the rectifiers 12 to 17.

I claim as my invention:

1. In apparatus operative with a first alternating current source having a substantially constant frequency for providing a second alternating current having a controlled frequency and a controlled number of phases, the combination of a rectifier unit operative with said first source for providing direct current, an inverter including switching elements operative with said direct current for providing said second alternating current, control signal supply means operatively connected to supply control signals to said switching elements for controlling said frequency and said number of phases of said second alternating current, with said control signal supply means being operative with said rectifier unit for synchronizing the operation of said rectifier unit relative to the operation of said inverter, with each said rectifier unit and said inverter including switching elements of a predetermined one of the n-p-n-p type and the p-n-p-n type, with the inverter switching elements being responsive to said control signals both for causing the latter switching elements to be conductive and for preventing conduction by the latter switching elements.

2. In apparatus operative with a first alternating current source having a substantially constant frequency for providing a second alternating current having a controlled frequency and a controlled number of phases, the combination of a rectifier unit operative with said first source for providing direct current, an inverter including switching elements operative with said direct current for providing said second alternating current, control signal supply means operatively connected to supply control signals to said switching elements for controlling said frequency and said number of phases of said second alternating current, with said control signal supply means being operatively connected to said rectifier unit for synchronizing the operation of said rectifier unit relative to the operation of said inverter, with each said rectifier unit and said inverter including switching elements of a predetermined one of the n-p-n-p type and the p-n-p-n type, with the inverter switching elements being responsive to said control signals both for causing at least one of the latter switching elements to be conductive while preventing conduction by at least a different one of the latter switching elements.

3. In apparatus operative with a first alternating current source having a substantially constant frequency for providing a second alternating current having a controlled frequency and a controlled number of phases, the combination of a rectifier unit including a capacitor member and being operative with said signal source for providing direct current, an inverter including switching elements operative with said direct current for providing said second alternating current, control signal supply means operatively connected to supply control signals to said switching elements for controlling said frequency and said number of phases of said second alternating current signal, with said control signal supply means being operatively connected to said rectifier unit for synchronizing the operation of said rectifier unit relative to the operation of said inverter, with each of said rectifier unit and said inverter including switching elements of a predetermined one of the n-p-n-p type and the p-n-p-n type, with the inverter switching elements being responsive to said control signals both for causing at least one of the latter switching elements to be conductive and for preventing conduction by at least a different one of the latter switching elements, and a plurality of unidirectionally conductive devices, with each of the latter devices being connected in parallel with a different one of the latter said switching elements for conducting reactive current around its associated switching element to said capacitor member when said switching element is not conducting.

References Cited in the file of this patent

UNITED STATES PATENTS

| | | |
|---|---|---|
| 2,415,708 | Sciaky | Feb. 11, 1947 |
| 2,431,262 | Longini | Nov. 18, 1947 |

FOREIGN PATENTS

| | | |
|---|---|---|
| 707,640 | Great Britain | Apr. 21, 1954 |

OTHER REFERENCES

"Solid-State Thyratron Switches," by R. P. Frenzel and F. W. Gutzwiller, published in Electronics, March 28, 1958.